(12) United States Patent
Ito

(10) Patent No.: US 8,371,351 B2
(45) Date of Patent: Feb. 12, 2013

(54) PNEUMATIC RADIAL TIRE

(75) Inventor: Takahiro Ito, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 427 days.

(21) Appl. No.: 12/741,082

(22) PCT Filed: Oct. 31, 2008

(86) PCT No.: PCT/JP2008/069958
§ 371 (c)(1),
(2), (4) Date: Jun. 9, 2010

(87) PCT Pub. No.: WO2009/057781
PCT Pub. Date: May 7, 2009

(65) Prior Publication Data
US 2010/0252161 A1    Oct. 7, 2010

(30) Foreign Application Priority Data

Nov. 2, 2007    (JP) .................. 2007-286341

(51) Int. Cl.
*B60C 3/06* (2006.01)
*B60C 9/17* (2006.01)
(52) U.S. Cl. ...................................... 152/456
(58) Field of Classification Search ............ 152/209.16, 152/454–456, 525; B60C 3/06, 9/17
See application file for complete search history.

(56) References Cited

U.S. PATENT DOCUMENTS 3,536,118 A    10/1970    Boileau

FOREIGN PATENT DOCUMENTS

| JP | 46-33321 A | 9/1971 |
|---|---|---|
| JP | 63-020201 A | 1/1988 |
| JP | 02-185803 A | 7/1990 |
| JP | 08-156532 A | 6/1996 |
| JP | 2007-083913 A | 4/2007 |

OTHER PUBLICATIONS

International Search Report dated Jan. 27, 2009 (with translation) (5 pages).

*Primary Examiner* — Justin Fischer
*Assistant Examiner* — Philip N Schwartz
(74) *Attorney, Agent, or Firm* — Sughrue Mion, PLLC

(57) ABSTRACT

A pneumatic radial tire includes a pair of annular bead portions 2A, 2B, a tread portion 3 having a tread surface portion 3a, a pair of sidewall portions 4A, 4B each connecting one of both end portions in the tire-width directions of the tread portion 3 and an outward end in the tire-radial direction of the corresponding one of the bead portions, and a carcass layer 5 extending continuously across and through the bead portions, the sidewall portions, and the tread portion, the carcass layer being configured to form a framework of the tire. In a section taken in the tire-width directions, a first rubber gauge G1, G2 on a vehicle-fitted outer side is thicker than a first rubber gauge on a vehicle-fitted inner side, the first rubber gauge being defined as a thickness measured from a tire's external surface to the carcass layer and measured at each of the both tire-width-direction end portions of the tread portion, and a second rubber gauge G3, G4 on the vehicle-fitted outer side has a smaller thickness than a second rubber gauge on the vehicle-fitted inner side does, the second rubber gauge being defined as a thickness measured from the tire's external surface to the carcass layer in the tire-width direction and measured at each of both widest portions 4a, 4b of the sidewall portion, the widest portions being the portions protruding most externally in the tire-width directions.

9 Claims, 5 Drawing Sheets

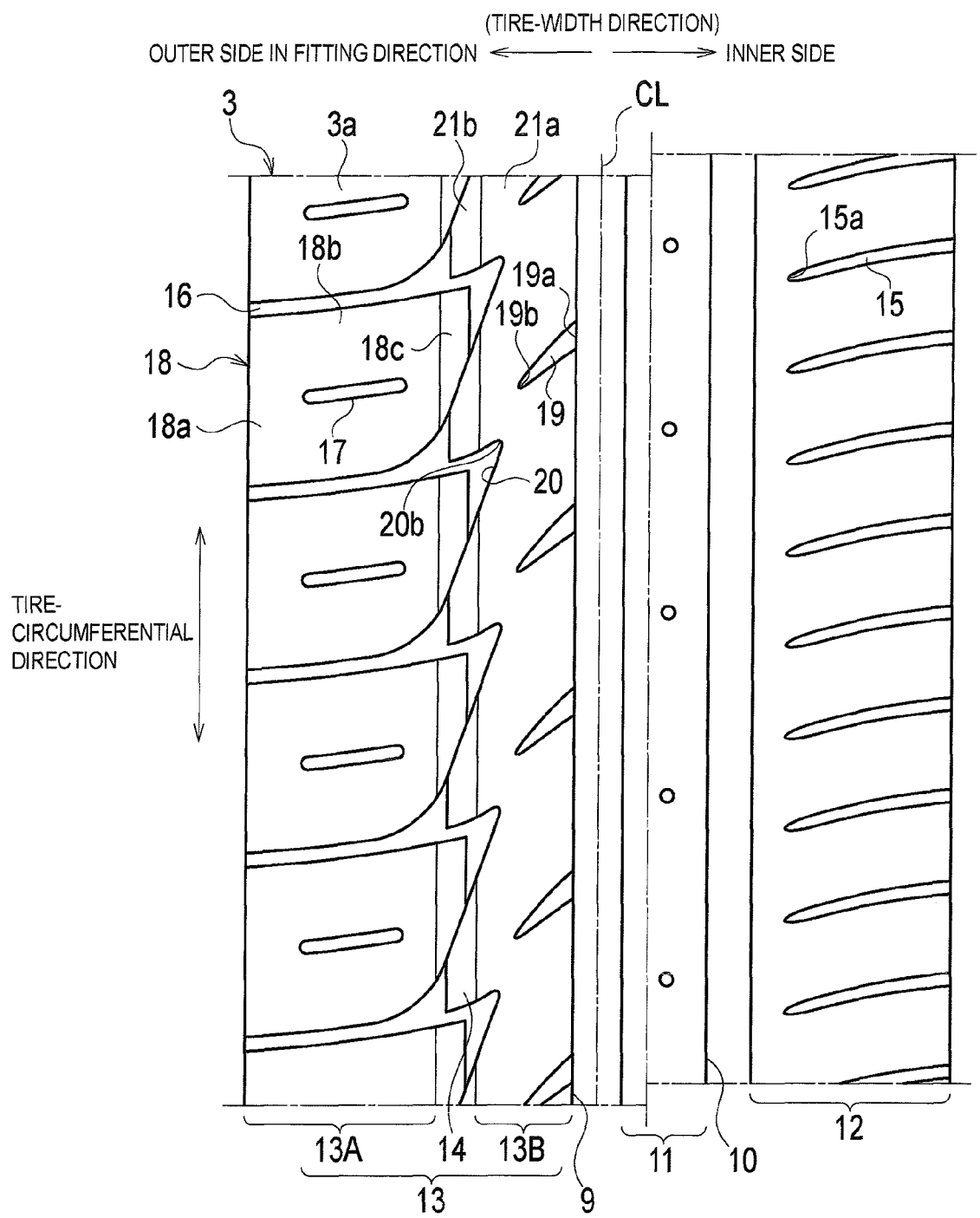

FIG. 4

|  | CONVENTIONAL EXAMPLE | EXAMPLE 1 | MEASUREMENT CONDITIONS |
|---|---|---|---|
| OUTER SIDE: FIRST RUBBER GAGE AT END PORTION OF TREAD PORTION | 9.5 | 10.0 | 8.0J-17, 210kPa |
| INNER SIDE: FIRST RUBBER GAGE AT END PORTION OF TREAD PORTION | 9.5 | 9.0 | |
| OUTER SIDE: SECOND RUBBER GAGE AT WIDEST PORTION OF SIDEWALL PORTION | 3.5 | 3.0 | |
| INNER SIDE: SECOND RUBBER GAGE AT WIDEST PORTION OF SIDEWALL PORTION | 3.5 | 4.0 | |
| OUTER SIDE: SURFACE CURVATURE RADIUS OF CASE LINE OF CARCASS LAYER | 50 | 85 | |
| INNER SIDE: SURFACE CURVATURE RADIUS OF CASE LINE OF CARCASS LAYER | 50 | 50 | |
| OUTER SIDE: LENGTH, MEASURED IN TIRE-RADIAL DIRECTION, OF WIDEST CONVEX PORTION IN TIRE-WIDTH DIRECTION | 53 | 53 | |
| INNER SIDE: LENGTH, MEASURED IN TIRE-RADIAL DIRECTION, OF WIDEST CONVEX PORTION IN TIRE-WIDTH DIRECTION | 53 | 55 | |
| WIDTH OF CONTACT PATCH OF TIRE (INDEX) | 100 | 101 | 8.0J-17, 230kPa, CA:2.0, LOAD:7.5kN |
| AREA OF CONTACT PATCH OF TIRE (INDEX) | 100 | 103 | |
| AVERAGE RUNNING SPEED (INDEX) | 100 | 101 | 7.5J-17, Fr/Re:230/190kPa |

FIG. 5

|  | CONVENTIONAL EXAMPLE | EXAMPLE 2 | MEASUREMENT CONDITIONS |
|---|---|---|---|
| OUTER SIDE: FIRST RUBBER GAGE AT END PORTION OF TREAD PORTION | 9.5 | 10.0 | 8.0J-17, 210kPa |
| INNER SIDE: FIRST RUBBER GAGE AT END PORTION OF TREAD PORTION | 9.5 | 9.0 | |
| OUTER SIDE: SECOND RUBBER GAGE AT WIDEST PORTION OF SIDEWALL PORTION | 3.5 | 3.0 | |
| INNER SIDE: SECOND RUBBER GAGE AT WIDEST PORTION OF SIDEWALL PORTION | 3.5 | 4.0 | |
| OUTER SIDE: SURFACE CURVATURE RADIUS OF CASE LINE OF CARCASS LAYER | 50 | 85 | |
| INNER SIDE: SURFACE CURVATURE RADIUS OF CASE LINE OF CARCASS LAYER | 50 | 50 | |
| OUTER SIDE: LENGTH, MEASURED IN TIRE-RADIAL DIRECTION, OF WIDEST CONVEX PORTION IN TIRE-WIDTH DIRECTION | 53 | 53 | |
| INNER SIDE: LENGTH, MEASURED IN TIRE-RADIAL DIRECTION, OF WIDEST CONVEX PORTION IN TIRE-WIDTH DIRECTION | 53 | 55 | |
| OUTER SIDE: LENGTH OF BEAD FILLER | 40 | 40 | |
| INNER SIDE: LENGTH OF BEAD FILLER | 40 | 35 | |
| WIDTH OF CONTACT PATCH OF TIRE (INDEX) | 100 | 101 | 8.0J-17, 230kPa, CA:2.0, LOAD:7.5kN |
| AREA OF CONTACT PATCH OF TIRE (INDEX) | 100 | 103 | |
| STIFFNESS, MEASURED IN RADIAL DIRECTION, OF CASE ON INNER SIDE (INDEX) | 100 | 97 | 8.0J-17, Fr/Re:230/190kPa |
| AVERAGE RUNNING SPEED (INDEX) | 100 | 100.5 | |

PNEUMATIC RADIAL TIRE

TECHNICAL FIELD

The invention relates to a pneumatic radial tire including a carcass layer that extends continuously across all of bead portions, sidewall portions, and a tread portion.

BACKGROUND ART

Patent Document 1 discloses a pneumatic radial tire as related conventional art of this kind.

In the pneumatic radial tire, a portion that protrudes most in the tire-width direction, i.e., the widest portion is located in a sidewall portion on the vehicle-fitted outer side. The rubber gauge (the thickness of the rubber measured from the external surface of the tire to a carcass layer) of the widest portion is designed to be smaller than the rubber gauge of a widest portion in a sidewall portion on the vehicle-fitted inner side.

The pneumatic radial tire with the above-described configuration is made lighter in weight and reduces the transmission of a noise to the passenger compartment, the noise being generated at a tread portion during running.
Patent Document 1: JP-A Hei 8-156532

DISCLOSURE OF THE INVENTION

It is certain that the above-described pneumatic radial tire can be made lighter in weight and can reduce the noise in the passenger compartment. The design of the above-described pneumatic radial tire, however, does not take the following fact into consideration. The difference between the rubber gauges makes the external shapes of the tire different when the tire is inflated with air.

In addition, the above-described pneumatic radial tire has the following problem. A centrifugal force is generated when the vehicle turns at a corner or the like. The centrifugal force thus generated causes a lateral load on the pneumatic radial tire. The lateral load, in turn, causes a greater load on the sidewall portion on the vehicle-fitted outer side. Accordingly, the greater load may deform the sidewall portion and the tread portion. If such deformation occurs, the contact area of the tread portion is decreased. Consequently, the handling stability of such pneumatic radial tires is impaired while the vehicle is turning.

A pneumatic radial tire may be provided with sidewall portions of increased stiffness both at the outer side and the inner side of the tread portion of the vehicle-fitted tire for reducing such deformation in the sidewall portions. The solution, however, has the following problems. While the vehicle runs straight, the inner side of the tread portion of the vehicle-fitted tire may mainly come into contact with the ground. In this case, the sidewall portion on the inner side of the vehicle-fitted pneumatic radial tire with such a configuration has too high a stiffness to allow the necessary deformation of the sidewall portion. Accordingly, the pneumatic radial tire of such a configuration has the tread portion that cannot follow the road surface well. The vehicle may become less stable when travelling in a straight line and may have inferior acceleration-deceleration performances.

The invention is thus made in view of such circumstances, and aims to provide a pneumatic radial tire capable of: securing sufficient stability while the vehicle is travelling straight; and guaranteeing higher handling stability while the vehicle is turning.

To solve the problem, the present invention has the following features. A first feature of the present invention relates to a pneumatic radial tire (tire 1) including a pair of annular bead portions (bead portions 2A, 2B), a tread portion (tread portion 3) located at an external side, in a tire-radial direction, of the pair of bead portions, and including a tread surface portion (tread surface portion 3a) including a tire equator line (tire equator line CL) that is a center line in tire-width directions, a pair of sidewall portions (sidewall portions 4A, 4B) each connecting one of both end portions (tire-width-direction end portion 3b, 3c) in the tire-width directions of the tread portion and an outward end in the tire-radial direction of the corresponding one of the bead portions, and a carcass layer (carcass layer 5) extending continuously across and through the bead portions, the sidewall portions, and the tread portion, the carcass layer being configured to form a framework of the tire. In a section taken in the tire-width directions, a first rubber gauge (first rubber gauge G1, G2) on a vehicle-fitted outer side is thicker than a first rubber gauge on a vehicle-fitted inner side, the first rubber gauge being defined as a thickness measured from a tire's external surface to the carcass layer and measured at each of the both tire-width-direction end portions of the tread portion, and a second rubber gauge (second rubber gauge G3, G4) on the vehicle-fitted outer side has a smaller thickness than a second rubber gauge on the vehicle-fitted inner side does, the second rubber gauge being defined as a thickness measured from the tire's external surface to the carcass layer in the tire-width direction and measured at each of both widest portions (widest portions 4a, 4b) of the sidewall portion, the widest portions being the portions protruding most externally in the tire-width directions.

According to the aspect, the first rubber gauges measured from the external surface to the carcass layer at each of the both end portions of the tread portion laterally extending in the tire-width directions are constructed so that the first rubber gauge on the vehicle-fitted outer side is thicker than the first rubber gauge on the vehicle-fitted inner side. In addition, the second rubber gauges measured from the tire's external surface to the carcass layer at each of the widest portions that protrude most in the tire width directions respectively from the sidewall portions are constructed so that the second rubber gauge on the vehicle-fitted outer side is thinner than the second rubber gauge on the vehicle-fitted inner side.

Accordingly, in buttress portions (each of which refers to the portion extending from each tire-width-direction end portion of the tread portion to the widest portion of the corresponding sidewall portion) in the sidewall portions of the pneumatic radial tire inflated with air, the case line of the carcass layer on the vehicle-fitted outer side has a larger surface curvature radius than the surface curvature radius of the case line of the carcass layer on the vehicle-fitted inner side.

Accordingly, the tension acting on the carcass layer of the buttress portion on the vehicle-fitted outer side is larger than the tension acting on the carcass layer of the buttress portion on the vehicle-fitted inner side. This means that, in the pneumatic radial tire, the sidewall portion on the vehicle-fitted outer side has higher stiffness than the sidewall portion on the vehicle-fitted inner side.

Incidentally, when a vehicle turns at a corner or the like, and the pneumatic radial tires fitted to the vehicle receive a lateral centrifugal force, some of the pneumatic radial tires are biased towards the vehicle-fitted outer side. If this occurs, in each of such outwardly-biased tires, a larger portion of the contact patch of the tread portion is located in an area extending from the tire equator line to the vehicle-fitted outer side. In this case, the sidewall portion on the vehicle-fitted outer side carries a heavier load than the sidewall portion on the opposite side does.

Even in this case, the sidewall portion on the vehicle-fitted outer side can reduce the deformation of the sidewall portion, and thereby can secure a sufficiently large contact area of the tread portion. Accordingly, the pneumatic radial tire of the aspect of the invention can enhance the handling stability while the vehicle is turning.

In contrast, while the vehicle goes straight, each of the front tires, which is fitted to the vehicle at a certain camber angle, has a contact patch of the tread portion located mainly in an area extending from the tire equator line to the vehicle-fitted inner side. In this case, the sidewall portion on the vehicle-fitted inner side carries a heavier load than the sidewall portion on the opposite side. The sidewall portion provided on the vehicle-fitted inner side has a lower stiffness than the side wall portion on the vehicle-fitted outer side, so that the sidewall portion on the vehicle-fitted inner side can deform easily.

Accordingly, while the vehicle is running straight and the sidewall portion on the vehicle-fitted inner side carries a heavier load than the sidewall portion on the vehicle-fitted outer side does, the easily-deformable sidewall portion gives the tread portion a higher capability of following the road surface. Consequently, the pneumatic radial tire can improve the straight-running stability and the acceleration/deceleration performance of the vehicle.

A second feature of the present invention relates to the first feature of the present invention, and the carcass layer forms a case line that is a line passing through a center of the carcass layer when viewed in the section of the tire taken in the tire-width directions, and a surface curvature radius of a portion of the case line on the vehicle-fitted outer side is larger than a surface curvature radius of a portion of the case line on the vehicle-fitted inner side, each of the portions of the case line being a portion corresponding to a portion extending from one of the tire-width-direction end portions of the tread portion to the widest portion of the corresponding one of the sidewall portions.

A third feature of the present invention relates to the first feature of the present invention, and a length (length H1, for example), measured in the tire-radial direction, from the widest portion to the bead portion on the vehicle-fitted outer side is shorter than a corresponding length on the vehicle-fitted inner side.

A fourth feature of the present invention relates to the first feature of the present invention, and the pneumatic radial tire further includes bead fillers (bead filler 6A, for example) respectively provided at the external side, in the tire-radial direction, of the bead portions. In the section of the tire taken in the tire-width directions, a cross-sectional area of the bead filler provided on the vehicle-fitted outer side is larger than a cross-sectional area of the bead filler provided on the vehicle-fitted inner side.

A fifth feature of the present invention relates to the first feature of the present invention, and the pneumatic radial tire further includes bead fillers respectively provided at the external side, in the tire-radial direction, of the bead portions and a hardness of the bead filler provided on the vehicle-fitted outer side is higher than a hardness of the bead filler provided on the vehicle-fitted inner side.

A sixth feature of the present invention relates to the first feature of the present invention, and bead fillers respectively provided at the external side, in the tire-radial direction, of the bead portions, and a sheet-like bead filler sheet provided on the bead filler on the vehicle-fitted outer side in such a manner as to extend from an internal side to the external side in the tire-radial direction.

A seventh feature of the present invention relates to the fourth feature of the present invention, and a length, measured in the tire-radial direction, of the bead filler provided on the vehicle-fitted outer side is longer than a length, measured in the tire-radial direction, of the bead filler provided on the vehicle-fitted inner side.

A eighth feature of the present invention relates to the fourth feature of the present invention, and a maximum thickness, measured in the tire-width directions, of the bead filler provided on the vehicle-fitted outer side is larger than a maximum thickness, measured in the tire-width directions, of the bead filler provided on the vehicle-fitted inner side.

A ninth feature of the present invention relates to the first feature of the present invention, and main grooves formed respectively in a tire's equatorial portion including the tire equator line and in a portion located closer to the vehicle-fitted inner side than the tire's equatorial portion is, each main groove extending in a tire-circumferential direction.

A pneumatic radial tire to be provided according to the aspects of the invention is capable of: securing the straight-running stability of the vehicle; and improving the handling stability when the vehicle turns.

BRIEF DESCRIPTION OF THE DRAWINGS

FIG. 3 shows the embodiment of the invention and is a development of a pattern formed in a tread portion of the pneumatic radial tire.

FIG. 4 shows Example 1 of the invention and is a figure showing various data in measuring the width and the area of the contact patch of each of pneumatic radial tires and the average running speed of the same test vehicle fitted with the respective tires running on a circuit test course regarding Conventional Example and the Example 1.

FIG. 5 shows Example 2 of the invention and is a figure showing various data of Conventional Example and Example 2 in measuring the width and the area of the contact patch of each of pneumatic radial tires and the average running speed of the same test vehicle fitted with the respective tires running on a circuit test course.

BEST MODES FOR CARRYING OUT THE INVENTION

[Embodiments]

Figure 1:
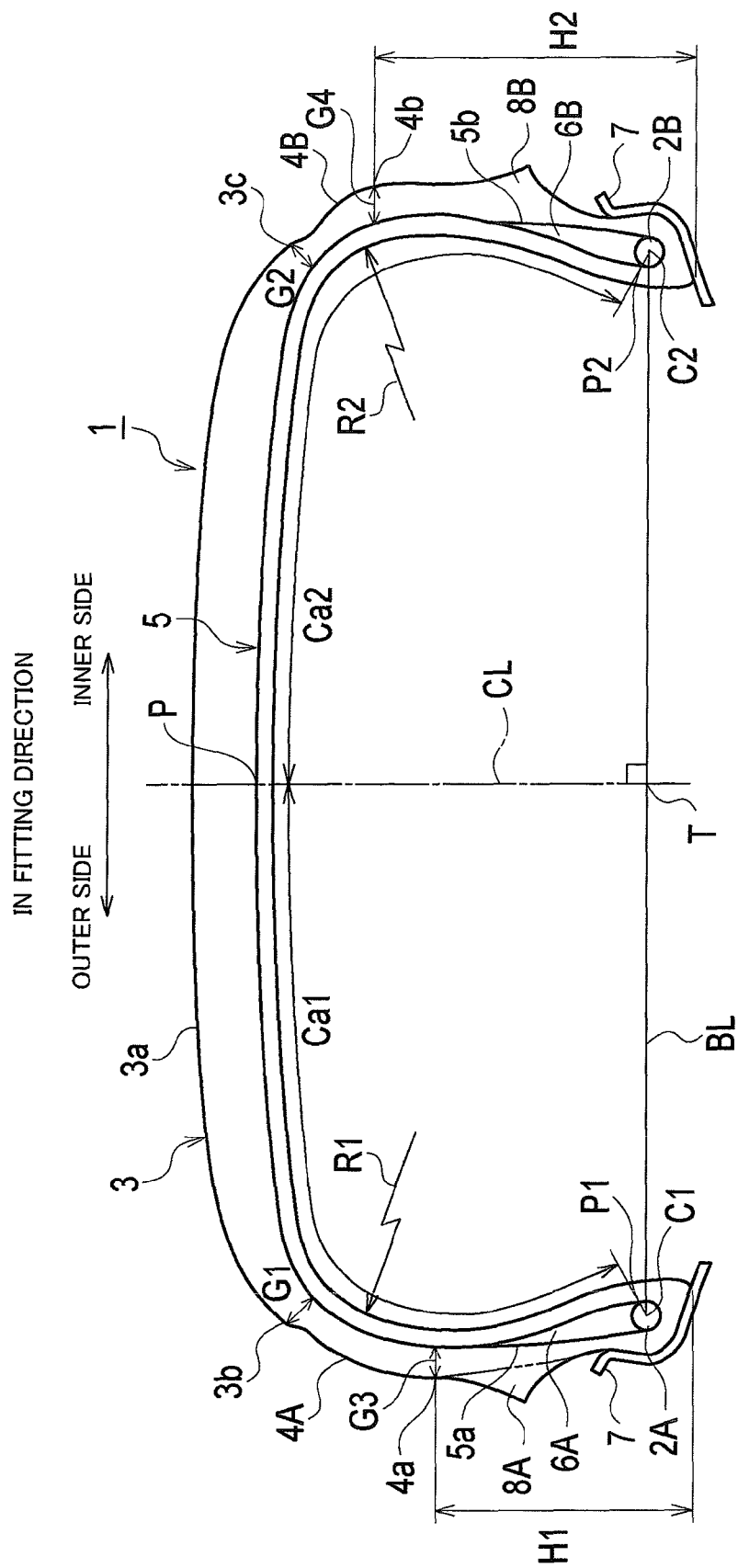
FIG. 1 shows an embodiment of the invention and is a sectional view of a pneumatic radial tire inflated with air.

Some embodiments of the invention will be described below by referring to the drawings. Specifically, (1) overall configuration of a pneumatic radial tire; (2) detailed configuration of a tread surface portion; (3) detailed configuration of an outer-side lateral groove; and (4) advantageous effects are explained.

Figure 2:
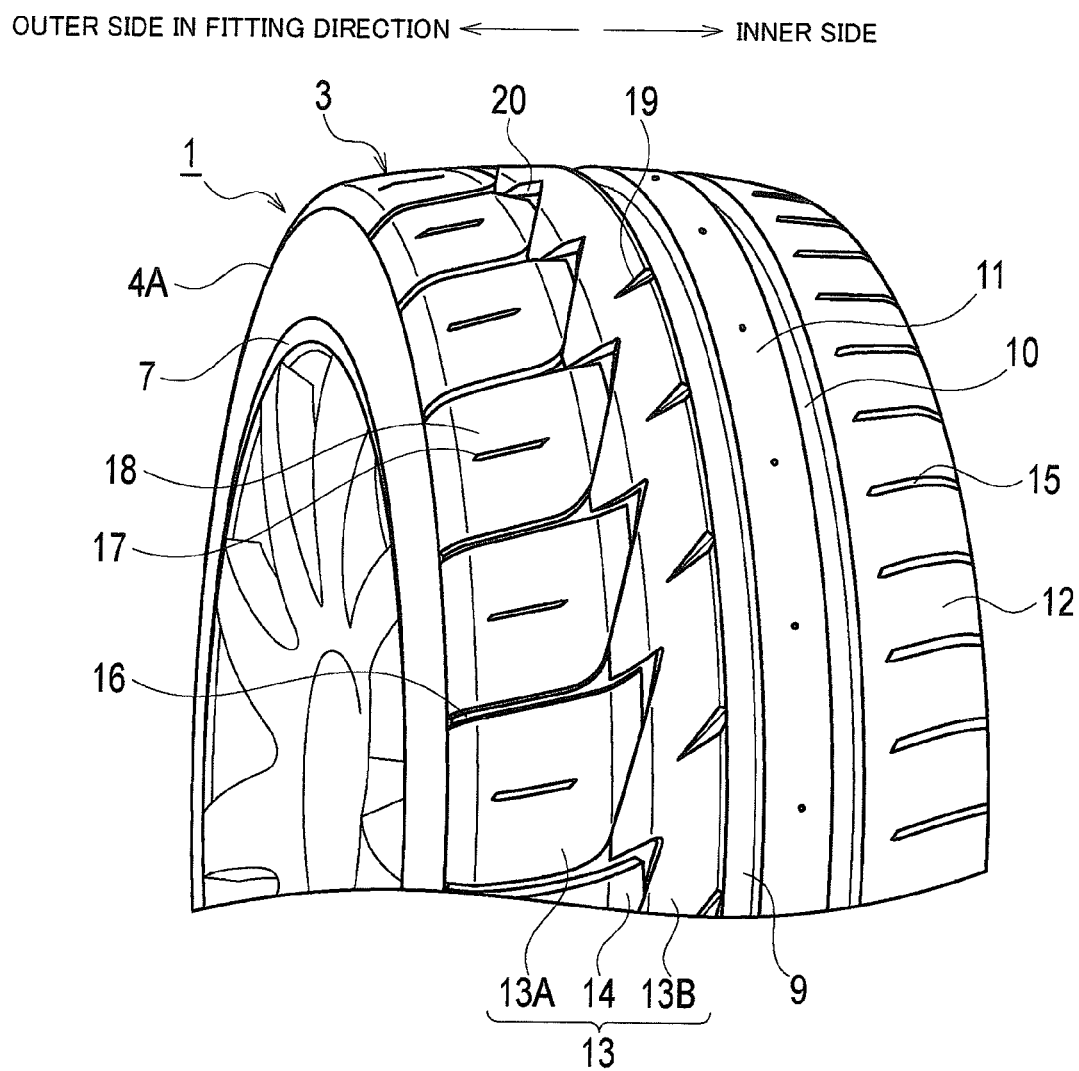
FIG. 2 shows the embodiment of the invention and is a perspective view of the pneumatic radial tire.

FIGS. 1 to 3 show an embodiment of the invention. FIG. 1 is a sectional view of a pneumatic radial tire inflated with air.

(1) Overall Configuration of Pneumatic Radial Tire

The overall configuration of the pneumatic radial tire will be described by referring to FIG. 1. As FIG. 1 shows, a pneumatic radial tire (hereafter, referred to as a "tire") 1 of this embodiment includes a left-and-right pair of bead portions 2A and 2B, a tread portion 3, a left-and-right pair of sidewall portions 4A and 4B, and a carcass layer 5.

Each of the bead portions 2A and 2B has an annular shape. The tread portion 3 is located at the outer side, in a tire-radial direction, of the bead portions 2A and 2B. The tread portion 3 includes a tread surface portion 3a. The sidewall portion 4A connects an end portion 3b, in a tire-width direction, of the tread portion 3 and the outward end, in the tire-radial direction, of the bead portion 2A. Meanwhile, the sidewall portion 4B connects an end portion 3c, in the tire-width direction, of the tread portion 3 and the outward end, in the tire-radial direction, of the bead portion 2B. The carcass layer 5 extends continuously across and through the bead portions 2A and 2B, the sidewall portions 4A and 4B, and the tread portion 3.

In the sidewall portion 4A on a vehicle-fitted outer side, a buttress portion is formed so as to extend from the tire-width-direction end portion 3b of the tread portion 3 to a widest portion 4a of the sidewall portion 4A. Likewise, in the sidewall portion 4B on a vehicle-fitted inner side, a buttress portion on the vehicle-fitted inner side is formed so as to extend from the tire-width-direction end portion 3c of the tread portion 3 to a widest portion 4b of the sidewall portion 4A.

The tire 1 of this embodiment is provided with a bead filler 6A. The bead filler 6A is located at the outer side, in the tire-radial direction, of the bead portion 2A on the vehicle-fitted outer side. In the tire 1, one end of the carcass layer 5 extends in the tire-width direction from the tire's equator-line side, and then folds back toward the vehicle-fitted outer side so as to roll the bead portion 2A and the bead filler 6A up. In the tire 1, the terminal end of a folding-back portion 5a is located at the outer side, in the tire-radial direction, of the bead filler 6A.

Likewise, the tire 1 is provided with a bead filler 6B. The bead filler 6B is located at the outer side, in the tire-radial direction, of the bead portion 2B on the vehicle-fitted inner side. In the tire 1, the other end of the carcass layer 5 extends in the tire-width direction from the tire's equator-line side, and then folds back toward the vehicle-fitted inner side so as to roll the bead portion 2B and the bead filler 6B up. In the tire 1, the terminal end of a folding-back portion 5b is located at the outer side, in the tire-radial direction, of the bead filler 6B.

Before the tire 1 of this embodiment is inflated with air at a predetermined air pressure, end portions located at the sides of the bead portions 2A and 2B are attached respectively to rim flanges 7. The tire 1 is fitted to the vehicle so that the pre-designated inner side of the tire 1 has to face the vehicle and that the pre-designated outer side of the tire has to face the opposite side. Specifically, the bead portion 2A and the sidewall portion 4A located on one side of the tire 1 have to be fitted on the vehicle-fitted outer side, whereas the bead portion 2B and the sidewall portion 4B located on the other side of the tire 1 have to be on the vehicle-fitted inner side.

The sidewall portion 4A and 4B respectively include the widest portions 4a and 4b, which are the portions protruding most externally in the tire-width directions.

Each of rim-guard portions 8A and 8B is formed closer to the corresponding rim flange 7 than the corresponding one of the widest portions 4a and 4b is. The rim-guard portions 8A and 8B protrude more externally in the tire-width directions than their respective rim flanges 7.

The widest portion 4a and 4b protrude more externally in the tire-width directions than any other portions of the tire 1 except the rim-guard portions 8A and 8B.

The length, measured in the tire-radial directions, from the widest portion to the bead portion on the vehicle-fitted outer side is shorter than the corresponding length on the vehicle-fitted inner side.

Specifically, a length H1 is shorter than a length H2. Here, the length H1 is defined as the length, measured in the tire-radial directions, from the widest portion 4a of the sidewall portion 4A to the end portion of the bead portion 2A on the vehicle-fitted outer side. The length H2 is defined as the length, measured in the tire-radial directions, from the widest portion 4b of the sidewall portion 4B to the end portion of the bead portion 2B on the vehicle-fitted inner side.

A first rubber gauge is defined as the thickness, measured in the tire-width directions, from the tire's external surface to the carcass layer 5 at one of the both end portions of the tread portion 3. In the section taken in the tire-width directions, the first rubber gauge on the vehicle-fitted outer side is thicker than the first rubber gauge on the vehicle-fitted inner side.

Specifically, in the section taken in the tire-width directions, a first rubber gauge G1 is thicker than a first rubber gauge G2. Here, the first rubber gauge G1 is defined as the thickness of the rubber, measured in the tire-width directions, from the tire's external surface of the end portion 3b of the tread portion 3 to the carcass layer 5 located on the vehicle-fitted outer side. The first rubber gauge G2 is defined as the thickness of the rubber, measured in the tire-width directions, from the tire's external surface of the end portion 3c of the tread portion 3 to the carcass layer 5 located on the vehicle-fitted inner side.

The first rubber gauge G1 measured from the tire's external surface to the end portion of the carcass layer 5 facing the tire's external surface refers to the thickness measured along a straight line which passes on the tire-width-direction end portion 3b and which orthogonally intersects the carcass layer 5. The first rubber gauge G2 measured from the tire's external surface to the end portion of the carcass layer 5 facing the tire's external surface refers to the thickness measured along a straight line which passes on the tire-width-direction end portion 3c and which orthogonally intersects the carcass layer 5.

A second rubber gauge is defined as the thickness measured from the tire's external surface to the carcass layer 5 at each of the widest portions 4a and 4b that protrude most in the tire-width directions respectively from the sidewall portions 4A and 4B. In the section taken in the tire-width directions, the second rubber gauge on the vehicle-fitted outer side is thinner than the second rubber gauge on the vehicle-fitted inner side.

Specifically, in the section taken in the tire-width directions, a second rubber gauge G3 is thinner than a second rubber gauge G4. Here, the second rubber gauge G3 is defined as the thickness of the rubber measured from the tire's external surface to the carcass layer 5 at the widest portion 4a of the sidewall portion 4A on the vehicle-fitted outer side. The second rubber gauge G4 is defined as the thickness of the rubber measured from the tire's external surface to the carcass layer 5 at the widest portion 4b of the sidewall portion 4B on the vehicle-fitted inner side.

The second rubber gauge G3 measured from the tire's external surface to the end portion of the carcass layer 5 facing the tire's external surface refers to the thickness measured along a straight line which passes on the widest portion 4a and which orthogonally intersects the carcass layer 5. The second rubber gauge G4 measured from the tire's external surface to the end portion of the carcass layer 5 facing the tire's external surface refers to the thickness measured along a straight line which passes on the widest portion 4b and which orthogonally intersects the carcass layer 5.

In the section taken in the tire-width directions, the carcass layer 5 forms a case line, which is defined as the center line of the carcass layer 5 extending all along the carcass layer 5. Imagine that the surface curvature radii of two portions of the case line are measured. Each of the portions extends from one of the tire-width-direction end portions of the tread portion 3 to the widest portion of the corresponding one of the sidewall portions 4A and 4B. The surface curvature radius of the portion located on the vehicle-fitted outer side is larger than that of the portion located on the vehicle-fitted inner side.

Specifically, a surface curvature radius R1 is larger than a surface curvature radius R2 when the tire 1 is inflated with air. Here, the surface curvature radius R1 is defined as the surface curvature radius of the buttress portion (i.e., the portion extending from the tire-width-direction end portion 3b to the widest portion 4a) of the case line of the carcass layer 5 on the vehicle-fitted outer side. The surface curvature radius R2 is defined as the surface curvature radius of the buttress portion (i.e., the portion extending from the tire-width-direction end portion 3c to the widest portion 4b) of the case line of the carcass layer 5 on the vehicle-fitted inner side.

Accordingly, the tension acting on a portion of the carcass layer 5 corresponding to the buttress portion on the vehicle-fitted outer side is larger than the tension acting on a portion of the carcass layer 5 corresponding to the buttress portion on the vehicle-fitted inner side.

The maximum thickness, measured in the tire-width directions, of the bead filler 6A located on the vehicle-fitted outer side is larger than the maximum thickness, measured in the tire-width directions, of the bead filler 6B located on the vehicle-fitted inner side.

An intersecting point P is defined as follows. Firstly, in the section taken in the tire-width directions, a bead line BL is drawn from a center C1 of the bead portion 2A to a center C2 of the bead portion 2B. Then, a tire center line CL is drawn so as to pass on a center T of the bead line BL and so as to be orthogonal to the bead line BL. Then, the intersecting point P is determined as the point where the tire equator line CL intersects the case line (not illustrated) that passes in the center of and all along the carcass layer 5.

In addition, a point P1 is defined as the point which is on the case line and which is closest to the internal end of the bead portion 2A whereas a point P2 is defined as the point which is on the case line and which is closest to the internal end of the bead portion 2B. Then, an outer-side carcass periphery length Ca1 is defined as the distance, measured along the case line, from the intersecting point P to the point P1 whereas an inner-side carcass periphery length Ca2 is defined as the distance, measured along the case line, from the intersecting point P to the point P2. The outer-side carcass periphery length Ca1 is shorter than the inner-side carcass periphery length Ca2.

(2) Detailed Configuration of Tread Surface Portion

Detailed configuration of the tread surface portion will be described by referring to FIGS. 2 and 3. FIG. 2 is a perspective view of the pneumatic radial tire. FIG. 3 is a development of a pattern formed in the tread portion of the pneumatic radial tire.

As FIGS. 2 and 3 show, two main grooves 9 and 10 as well as plural land-portion rows 11, 12, and 13 are formed in the tread surface portion 3a of the tire 1. Each of the main grooves 9 and 10 extends in a tire-circumferential direction. Each of the land-portion rows 11, 12, and 13 extends in the tire-circumferential direction.

The main groove 9 is formed in a tire's equatorial portion that includes the tire equator line CL. The main groove 10 is formed in a portion located closer to the vehicle-fitted inner side than the tire's equatorial portion is. There is a certain space, in the tire-width directions, between the main groove 9 and the main groove 10.

The two main grooves 9 and 10 sub-divide the tread surface portion 3a into the center land-portion row 11, the inside-shoulder land-portion row 12, and the outside-shoulder land-portion row 13.

The center land-portion row 11 is located in a portion located closer to the vehicle-fitted inner side than the tire's equatorial portion is; thus, the center land-portion row 11 is shifted by just a short distance from the tire's equatorial portion. The inside-shoulder land-portion row 12 is located closer to the vehicle-fitted inner side than the center land-portion row 11 is. The outside-shoulder land-portion row 13 is located closer to the vehicle-fitted outer side than the tire's equatorial portion is.

The width, measured in the tire-width directions, of the outside-shoulder land-portion row 13 is wider than the width, measured in the tire-width directions, of the inside-shoulder land-portion row 12. Specifically, the width, measured in the tire-width directions, of the outside-shoulder land-portion row 13 is set approximately 1.5 times as wide as the width, measured in the tire-width directions, of the inside-shoulder land-portion row 12. Note that the "approximately 1.5 times" mentioned above means not only a factor of exact 1.5 but also any factor within a range from 1.3 to 1.8.

A V-shaped groove 14 is formed in the outside-shoulder land-portion row 13 so as to extend in the tire-circumferential direction. The V-shaped groove 14 sub-divides the outside-shoulder land-portion row 13 into a first outside-shoulder land-portion row 13A and a second outside-shoulder land-portion row 13B.

Plural inner-side lateral grooves 15 are formed in the inside-shoulder land-portion row 12 so as to extend in the tire-width directions. The plural inner-side lateral grooves 15 are arranged in the tire-circumferential direction at certain intervals.

Specifically, the pitches between two inner-side lateral grooves 15 that are adjacent to each other in the tire-circumferential direction are set within a range from 2.5% to 5% of the circumferential length of the tread portion 3.

Each of the inner-side lateral grooves 15 has an end located on the internal side in the tire-width directions (this end is referred to as an "internal end 15a") and an end located on the external side in the tire-width directions (this end is referred to as an "external end"). Specifically, the internal ends 15a are located at positions closer to the vehicle-fitted inner side than the main groove 10, which is formed in the portion located on the vehicle-fitted inner side. The external ends of the inner-side lateral grooves 15 are positioned on one of the both side portions of the tread portion 3. Specifically, the external ends of the inner-side grooves 15 are positioned on the side portion located on the vehicle-fitted inner side.

Accordingly, each of the inner-side lateral grooves 15 extends in the tire-width directions across the tire-width-direction end portion of the tread surface portion 3a located on the vehicle-fitted inner side.

In the first outside-shoulder land-portion row 13A, first outer-side lateral grooves 16 and second outer-side lateral grooves 17 are formed alternately in the tire-circumferential direction. Each of the lateral grooves 16 and 17 extends in the tire-width directions.

Each of the first outer-side lateral grooves 16 has an end located on the internal side in the tire-width directions, i.e., "internal end" and an end located on the external side in the tire-width directions, i.e., "external end".

Specifically, the internal ends of the first outer-side lateral grooves 16 are communicatively connected to the V-shaped groove 14. Each of the first outer-side lateral grooves 16 extends across the end portion of the tread surface portion 3a located on the vehicle-fitted outer side until the external end of the first outer-side lateral groove 16 reaches one of the both side portions of the tread portion 3. Specifically, the external end of the first outer-side lateral groove 16 reaches the side portion located on the vehicle-fitted outer side.

Accordingly, the first outer-side lateral grooves 16 subdivide the first outside-shoulder land-portion row 13A into plural outside-shoulder land portions 18.

Both of the two tire-width-direction ends of each of the second outer-side lateral grooves 17 are located within the corresponding one of the outside-shoulder land portions 18 and no end of each second outer-side lateral groove 17 reaches the V-shaped groove 14. In addition, no end of each second outer-side lateral groove 17 reaches the side portion of the tread portion 3 located on the vehicle-fitted outer side.

Within the first outside-shoulder land-portion row 13A, and a portion including the contact patch at the end portion of the tread portion 3 located on the vehicle-fitted outer side forms a block 18a extending continuously in the tire-circumferential direction.

Specifically, the pitches between two first outer-side lateral grooves 16 that are adjacent to one another in the tire-circumferential direction within the block 18a are set within a range from 5% to 10% of the circumferential length of the tread portion 3.

Accordingly, the pitches of the first outer-side lateral grooves 16 are larger than the pitches of the inner-side lateral grooves 15. Specifically, the pitches of the first outer-side lateral grooves 16 are set approximately twice as large as the pitches of the inner-side lateral grooves 15.

(3) Detailed Configuration of Outer-Side Lateral Groove

Next, detailed configurations of outer-side lateral grooves of this embodiment will be described by referring to FIG. 3.

In the second outside-shoulder land-portion row 13B, third outer-side lateral grooves 19 and fourth outer-side lateral grooves 20 are formed alternately in the tire-circumferential direction. Each of the lateral grooves 19 and 20 extends in the tire-width directions.

The plural third outer-side lateral grooves 19 are formed in an end portion of the second outside-shoulder land-portion row 13B, and this end portion of the second outside-shoulder land-portion row 13B refers to the one located on the vehicle-fitted inner side. The plural third outer-side lateral grooves 19 are arranged in the tire-circumferential direction at certain intervals. Each of the third outer-side lateral grooves 19 is communicatively connected to the main groove 9, which is formed in the tire's equatorial portion.

Each of the third outer-side lateral grooves 19 has a first end 19a and a second end 19b. The first end 19a faces the main groove 9, and is formed as a widely-open end. The second end 19b is located in the middle portion, in the tire-width directions, of the second outside-shoulder land-portion row 13B. Each of the third outer-side lateral grooves 19 becomes gradually narrower from the widely-open first end 19a towards the closed second end 19b. Accordingly, each of the third outer-side lateral grooves 19 has a V-shape.

The plural fourth outer-side lateral grooves 20 are formed in an end portion of the second outside-shoulder land-portion row 13B, and this end portion of the second outside-shoulder land-portion row 13B refers to the one located on the vehicle-fitted outer side. The plural fourth outer-side lateral grooves 20 are arranged in the tire-circumferential direction at certain intervals. Each of the fourth outer-side lateral grooves 20 is communicatively connected to the V-shaped groove 14.

Each of the fourth outer-side lateral grooves 20 has a first end and a second end 20b. The first end faces the V-shaped groove 14, and is formed as a widely-open end. The second end 20b is located in the middle portion, in the tire-width directions, of the second outside-shoulder land-portion row 13B. Each of the fourth outer-side lateral grooves 20 becomes gradually narrower from the widely-open first end towards the closed second end 20b. Accordingly, each of the fourth outer-side lateral grooves 20 has a V-shape.

Each of the outside-shoulder land portions 18 includes a first top-surface portion 18b and a first sloping-surface portion 18c. The first top-surface portion 18b is located on the outer side in the tire-width direction. As the first sloping-surface portion 18c extends from the first top-surface portion 18b to the inner side in the tire-width direction, the dent thus formed in the tire-radial direction becomes deeper and deeper.

Likewise, the second outside-shoulder land portion row 13B includes a second top-surface portion 21a and second sloping-surface portions 21b. The second top-surface portion 21a is located on the outer side in the tire-width direction. As each of the second sloping-surface portions 21b extends from the second top-surface portion 21a to the outer side in the tire-width direction, the dent thus formed in the tire-radial direction becomes deeper and deeper.

When the tire 1 is placed on a flat road surface under regular conditions and is kept stationary, the first top-surface portions 18b and the second top-surface portion 21a are in contact with the road surface. That is, the first top-surface portions 18b and the second top-surface portion 21a form a part of the contact patch of the tire 1 in that state.

The position, in the tire-circumferential direction, of each of the first sloping-surface portions 18c overlaps the position, in the tire-circumferential direction, of the corresponding one of the second sloping-surface portions 21b. The first sloping-surface portions 18c and the second sloping-surface portions 21b form a part of the sidewalls of the V-shaped groove 14, which is formed in the outside-shoulder land-portion row 13 located closer to the vehicle-fitted outer side than the tire's equatorial portion is.

Unlike the two main grooves 9 and 10, the depth (the dimension in the tire-radial direction) of the V-shaped groove 14 is not constant. The depth of the V-shaped groove 14 varies from one position to another in the tire-circumferential direction. The V-shaped groove 14 is communicatively connected to the first outer-side lateral grooves 16 and the fourth outer-side lateral grooves 20. The connecting portions are formed as flat bottom portions. The depths of the bottom portions are approximately the same as those of the first outer-side lateral grooves 16 and the fourth outer-side lateral grooves 20. In addition, bottom portions of different kinds are also formed in the V-shaped groove 14. These bottom portions correspond to the first sloping-surface portions 18c and the second sloping-surface portions 21b, so that these bottom portions are sloping. These sloping bottom portions are not as deep as the first lateral grooves 16 and not as deep as the fourth outer-side lateral grooves 20 either.

Accordingly, the V-shaped groove 14 is not formed as a groove which is continuous in the tire-circumferential direction with a constant depth that is approximately equal to the depths of the first outer-side lateral grooves 16 and the fourth outer-side lateral grooves 20. That is, the V-shaped groove 14 is formed as a discontinuous groove in that sense.

(4) Advantageous Effects

As has been described thus far, in the tire 1 of this embodiment, when the first rubber gauges $G_1$ and $G_2$—the thicknesses of rubber from the tire's external surface to the carcass layer 5—are measured respectively at the tire-width-direction end portions 3b and 3c of the tread portion 3 extending in the tire-width directions, the first rubber gauge $G_1$ on the vehicle-fitted outer side is thicker than the first rubber gauge G2 on the vehicle-fitted inner side. In addition, when the second rubber gauges G3 and G4—the thicknesses of rubber from the tire's external surface to the carcass layer 5—are measured respectively at the widest portions 4a and 4b that protrude most externally in their corresponding sidewall portions 4A and 4B, the second rubber gauge G3 on the vehicle-fitted outer side is thinner than the second rubber gauge G4 on the vehicle-fitted inner side.

Accordingly, in buttress portions (each of which refers to the portion extending from each of the tire-width-direction end portions 3b and 3c of the tread portion 3 to the corresponding one of the widest portions 4a and 4b of the sidewall portions 4A and 4B) in the sidewall portions 4A and 4B of the tire 1 inflated with air, the case line of the carcass layer on the vehicle-fitted outer side has a larger surface curvature radius than the surface curvature radius on the case line of the carcass layer 5 on the vehicle-fitted inner side.

Accordingly, the tension acting on the carcass layer 5 of the buttress portion on the vehicle-fitted outer side is larger than the tension acting on the carcass layer 5 of the buttress portion on the vehicle-fitted inner side. This means that sidewall portion 4A on the vehicle-fitted outer side of the tire 1 has higher stiffness than that on the vehicle-fitted inner side.

Incidentally, when a vehicle turns at a corner or the like, and the tires 1 fitted to the vehicle receive a lateral centrifugal force, some of the tires 1 are biased towards the vehicle-fitted outer side. If this occurs, a larger portion of the contact patch of the tread portion 3 is located in an area extending from the tire equator line CL to the vehicle-fitted outer side. In this case, the sidewall portion 4A on the vehicle-fitted outer side carries a heavier load than the sidewall portion 4B on the opposite side does.

Even in this case, the sidewall portion 4A on the vehicle-fitted outer side can reduce the deformation of the sidewall portion 4A, and thereby can secure a sufficiently large contact area of the tread portion. Accordingly, the tire 1 can enhance the handling stability while the vehicle is turning.

In contrast, while the vehicle goes straight, each of the front tires, which is fitted to the vehicle at a certain camber angle, has a contact patch of the tread portion 3 located mainly in an area extending from the tire equator line CL to the vehicle-fitted inner side. In this case, the sidewall portion 4B on the vehicle-fitted inner side carries a heavier load than the sidewall portion 4A on the opposite side. The sidewall portion 4B on the vehicle-fitted inner side has a lower stiffness than the sidewall portion 4A on the vehicle-fitted outer side, so that the sidewall portion 4B on the vehicle-fitted inner side can deform easily.

Accordingly, while the vehicle is running straight and the sidewall portion 4B on the vehicle-fitted inner side carries a heavier load than the sidewall portion 4A on the vehicle-fitted outer side does, the easily-deformable sidewall portion 4B gives the tread portion 3 a higher capability of following the road surface. Consequently, the tire 1 can improve the straight-running stability and the acceleration/deceleration performance of the vehicle.

In this embodiment, the surface curvature radius R1 of the case line extending along the portion from the tire-width-direction end portion 3b, in the tire-width directions, of the tread portion 3 to the widest portion 4a of the sidewall portion 4A is larger than the surface curvature radius R2 of the case line extending along the portion from the tire-width direction end portion 3c, in the tire-width directions, of the tread portion 3 to the widest portion 4b of the sidewall portion 4B. Accordingly, the carcass layer 5 draws the surface curvature radius R1 in one of the buttress portions differently from the surface curvature radius R2 in the other buttress portions. Consequently, the tire 1 has a more asymmetric shape when the vehicle-fitted inner side is compared to the vehicle-fitted outer side. This characteristic feature has a higher effect in the case of a tire of a relatively high profile type. This is because the sidewall portions of a high profile tire are relatively high and such higher sidewall portions allow the surface curvature radii to be set within a broader range of values.

In this embodiment, the length H1 measured in the tire-radial directions from the widest portion 4a, in the tire-width direction, of the sidewall portion 4A to the bead portion 2A on the vehicle-fitted inner side is shorter than the length H2 measured in the tire-radial directions from the tire-width-direction widest portion 4b of the sidewall portion 4B to the bead portion 2B on the vehicle-fitted inner side.

Accordingly, the sidewall portion 4B on the vehicle-fitted inner side has a lower stiffness than that of the sidewall portion 4A, and is thus more easily deformable. Consequently, while the vehicle fitted with the tires 1 is running straight, the tread portion 3 of each of the tires 1 shows better capability of following the road surface.

Conversely, the sidewall portion 4A on the vehicle-fitted outer side has a higher stiffness than that of the sidewall portion 4B, and is thus less easily deformable. Consequently, while the vehicle fitted with the tires 1 is turning, the deformation of each sidewall portion 4A on the vehicle-fitted outer side can be reduced, and thereby a larger contact area of the tread portion 3 can be secured.

In this embodiment, in the section taken in the tire-width directions, the bead filler 6A located on the vehicle-fitted outer side has a larger cross-sectional area than that of the bead filler 6B located on the vehicle-fitted inner side. Accordingly, in the tire 1, the stiffness of the sidewall portion 4A on the vehicle-fitted outer side can be enhanced furthermore while the stiffness of the sidewall portion 4B on the vehicle-fitted inner side can be lowered furthermore.

In this embodiment, the bead filler 6A located on the vehicle-fitted outer side has a higher hardness than that of the bead filler 6B located on the vehicle-fitted inner side. Accordingly, in the tire 1, the stiffness of the sidewall portion 4A on the vehicle-fitted outer side can be enhanced furthermore while the stiffness of the sidewall portion 4B on the vehicle-fitted inner side can be lowered furthermore.

In this embodiment, the tire 1 is provided with a bead-filler sheet, which is a sheet-like material extending from the internal side to the external side in the tire-radial direction and provided along the bead filler 6A located on the vehicle-fitted outer side. Accordingly, the tire 1 can enhance the stiffness of the sidewall portion 4A on the vehicle-fitted outer side.

In contrast, no such bead-filler sheet is provided on the vehicle-fitted inner side. Accordingly, the tire 1 can lower the stiffness of the sidewall portion 4B on the vehicle-fitted inner side.

This characteristic feature has a higher effect if the tire with such a characteristic feature is fitted to a heavier vehicle and thus the degree of the deformation of the tire is relatively large.

In this embodiment, the length, measured in the tire-radial direction, of the bead filler 6A located on the vehicle-fitted outer side is longer than the length, measured in the tire-radial direction, of the bead filler 6B located on the vehicle-fitted inner side. Accordingly, in the tire 1, the cross-sectional area of the bead filler 6A on the vehicle-fitted outer side can be easily made larger than the cross-sectional area of the bead filler 6B on the vehicle-fitted inner side.

As a consequence, the tire 1 can enhance the stiffness of the sidewall portion 4A on the vehicle-fitted outer side up to a much higher level than that on the vehicle-fitted inner side. This characteristic feature has a higher effect if the tire 1 with such a characteristic feature is fitted to a vehicle that shows a higher cornering performance. This is because, while the vehicle fitted with the tires 1 is turning, the deformation of the sidewall portion becomes relatively large.

In this embodiment, the maximum thickness, measured in the tire-width directions, of the bead filler 6A located on the vehicle-fitted outer side is larger than the maximum thickness, measured in the tire-width directions, of the bead filler 6B located on the vehicle-fitted inner side. Accordingly, in the tire 1, the cross-sectional area of the bead filler 6A can be easily made larger than the cross-sectional area of the bead filler 6B.

As a consequence, in the tire 1, the stiffness of the sidewall portion 4A on the vehicle-fitted outer side can be enhanced while the stiffness of the sidewall portion 4B on the vehicle-fitted inner side can be lowered. This characteristic feature has a higher effect if the tire 1 with such a characteristic feature is a tire of a low profile type having relatively low sidewall portions and is fitted to a vehicle that shows a higher cornering performance. This is because, while the vehicle fitted with the tires 1 is turning, the deformation of the sidewall portion becomes relatively large.

In this embodiment, both of the main grooves 9 and 10 are formed in an area extending from the tire's equatorial portion towards the vehicle-fitted inner side. The area in which the both of the main grooves 9 and 10 are formed is the main portion of the contact patch of the tread portion 3 while the vehicle is running straight. In addition, each of the main grooves 9 and 10 extends in the tire-circumferential direction. Accordingly, the tire 1 can improve the straight-running stability. In addition, both of the main grooves 9 and 10 can be used for draining water, so that the tire 1 can improve the drainage of the tread portion 3.

In addition, if the tire 1 receives a lateral centrifugal force while the vehicle fitted with the tire 1 is turning and if, as a result, the tire 1 is biased towards the vehicle-fitted outer side, the contact patch of the tread portion 3 is mainly located on the vehicle-fitted outer side. If this occurs, the contact area of the tread portion 3 located on the vehicle-fitted outer side is larger than the contact area of the tread portion 3 located on the vehicle-fitted inner side. Accordingly, the tire 1 can secure a larger contact area of the tread portion 3.

In this embodiment, a portion of the first outside-shoulder land portion row 13A, which includes the contact patch at the end portion of the tread portion 3 on the vehicle-fitted outer side, forms the rib portion 18a that extends continuously in the tire-circumferential direction. In addition, the tire-width-direction external end of each second outer-side lateral groove 17 is terminated within the corresponding outside-shoulder land portion 18. Moreover, if the pitches of the first outer-side lateral grooves 16 are measured in the block 18a, the pitches are set within a range from 5% to 10% of the circumferential length of the tread portion 3. Such pitches are approximately twice as large as the pitches of the inner-side lateral grooves 15.

Accordingly, the tire 1 can enhance the stiffness of the contact patch at the end portion of the tread portion 3 located on the vehicle-fitted outer side. Consequently, the deformation of the tread portion 3 can be reduced. Thereby, a larger contact area can be secured and the tread portion 3 can have higher durability.

In addition, in the tire 1, the pattern of the tread portion 3 is sub-divided, at the tire's equatorial portion of the tread portion 3, into a pattern on the vehicle-fitted outer side and a pattern on the vehicle-fitted inner side. The pattern on the outer side and the pattern on the inner side are formed asymmetrically. The main groove 9 is formed in the tire's equatorial portion whereas the main groove 10 is formed at the inner side of the tire's equatorial portion. The pitches of the lateral grooves 15 formed on the vehicle-fitted inner side are set within a range from 2.5% to 5% of the circumferential length of the tread portion 3. Both the pitches of the first outer-side lateral grooves 16 and the pitches of the second outer-side lateral grooves 17 are larger than the pitches of the lateral grooves 15. Accordingly, the contact area of the tread portion 3 on the vehicle-fitted outer side is set larger than the corresponding contact area on the vehicle-fitted inner side.

In this embodiment, the carcass periphery length Ca1 on the vehicle-fitted outer side is shorter than the carcass periphery length Ca2 on the vehicle-fitted inner side. Accordingly, conicity is generated in the tire 1, and thereby the lateral force at the time when the vehicle turns rises up smoothly. Consequently, the handling stability at the time when the vehicle turns can be improved.

If the tires 1 are fitted to both of the right and the left wheels, the conicity produced on the left-hand side of the vehicle and the conicity produced on the right-hand side of the vehicle have directions that are opposite to each other. Accordingly, the conicities on the both sides cancel each other out. Consequently, certain performance of travelling straight can be secured.

As has been described thus far, the tire 1 of this embodiment has a combination of an asymmetric pattern of the tread portion 3 and an asymmetric tire structure. The asymmetric pattern of the tread portion 3 refers to the asymmetry between the pattern on the vehicle-fitted outer side and the pattern on the vehicle-fitted inner side. The asymmetric tire structure refers to the asymmetry between the structure of a portion of the tire 1 located on the outer side of the tire 1 and the structure of a portion of the tire 1 located on the inner side of the tire 1.

Accordingly, if the vehicle is running straight and a relatively large load acts on the sidewall portion 4B on the vehicle-fitted inner side, the easily-deformable sidewall portion 4B allows the tread portion 3 to follow better the road surface. Accordingly, the tire 1 can improve the straight-running stability and the acceleration/deceleration performance of the vehicle.

In addition, when the vehicle fitted with the tire 1 turns and a lateral centrifugal force acting on the tire 1 biases the tire 1 towards the vehicle-fitted outer side, the contact area of the portion of tread portion 3 located on the vehicle-fitted outer side is larger than that on the vehicle-fitted inner side. Moreover, the tire 1 can secure a large contact area of the tread portion 3 by reducing the deformation of the sidewall portion 4A.

Accordingly, the tire 1 can improve the handling stability at the time when the vehicle turns.

Consequently, the tire 1 can provide comfortable ride while the vehicle fitted with the tires 1 is running normally, and can improve the lap time while the vehicle fitted with the tires 1 is running on a circuit in the critical state.

EXAMPLES

The width of and the area of the contact patch were measured using a pneumatic radial tire of Conventional Example and a pneumatic radial tire of Example 1. In addition, the average running speed was measured using a set of the pneumatic radial tires of each kind and the same test vehicle on a circuit-running test course. FIG. 4 shows various data on Example 1 at the testing.

Each of the pneumatic radial tires used in the test had a size of 225/45R17. The rubber gauge and the curvature, in the tire-radial direction, of the case line of the carcass layer were measured with each pneumatic radial tire inflated with air at 210 kPa. The measurement conditions were in conformity with 8.0J-17.

When the width of and the area of the contact patch of each tire were measured, the tire was inflated with air at 230 kPa and a load of 7.5 kN was applied to the inflated tire. The measurement results for Conventional Example were shown with indices of 100. The measurement conditions were in conformity with 8.0J-17, and the camber angle (CA) was 2.0°. The width of and the area of the contact surface become large as the index becomes large.

In addition, an Impreza STi was made to run on East course of Ebisu Circuit. Five laps were measured and the average time of the fastest three laps was calculated. The average time was converted to an index of the average running speed. The measurement conditions were in conformity with 7.5J-17, and the air pressures for the wheels were Fr/Re: 230/190 kPa. The average running speed become fast as the index becomes large.

The pneumatic radial tire of Conventional Example had a similar tread pattern to the one of the pneumatic radial tire of Example 1. The first rubber gauge at the end portion of the tread portion on the vehicle-fitted outer side was equal to the corresponding rubber gauge on the inner side. The second rubber gauge at the widest portion of the sidewall portion on the vehicle-fitted outer side was equal to the corresponding rubber gauge on the inner side. The surface curvature radius of the portions of the case line of the carcass layer on the vehicle-fitted outer side was equal to the corresponding surface curvature radius on the inner side. In other words, the pneumatic radial tire of Conventional Example had a symmetric structure.

In the pneumatic radial tire of Example 1, the first rubber gauge at the end portion of the tread portion on the vehicle-fitted outer side was 10.0 whereas the first rubber gauge at the end portion of the tread portion on the vehicle-fitted inner side was 9.0. Accordingly, the first rubber gauge on the vehicle-fitted outer side was set larger than the corresponding gauge on the inner side.

In addition, in the pneumatic radial tire of Example 1, the second rubber gauge at the widest portion of the sidewall portion on the vehicle-fitted outer side was 3.0 whereas the second rubber gauge at the widest portion of the sidewall portion on the vehicle-fitted inner side was 4.0. Accordingly, the second rubber gauge on the vehicle-fitted inner side was set larger than the corresponding gauge on the outer side thereof.

In the pneumatic radial tire of Example 1, the surface curvature radius of the portion of the case line of the carcass layer on the vehicle-fitted inner side was 50, which was equal to the corresponding surface curvature radius of the pneumatic radial tire of Conventional Example. In the pneumatic radial tire of Example 1, the surface curvature radius of the portion of the case line of the carcass layer on the vehicle-fitted outer side was 85, which was a relatively large value.

In addition, in the pneumatic radial tire of Example 1, the length, measured in the tire-radial direction, from the widest portion of the sidewall portion on the vehicle-fitted outer side to the corresponding bead portion was 53, which was equal to the corresponding length of the pneumatic radial tire of Conventional Example. In the pneumatic radial tire of Example 1, the length, measured in the tire-radial direction, from the widest portion of the sidewall portion on the vehicle-fitted inner side to the corresponding bead portion was 55.

In the pneumatic radial tire of Example 1, the length, measured in the tire-radial direction, of the widest portion of the sidewall portion on the vehicle-fitted inner side was set larger than the corresponding length on the outer side. Hence, the pneumatic radial tire of Example 1 had an asymmetric structure. Note that, in the pneumatic radial tire of Example 1, the length, measured in the tire-radial direction, of the bead filler on the vehicle-fitted outer side was set equal to the length, measured in the tire-radial direction, of the bead filler on the vehicle-fitted inner side.

As the measurement results for the pneumatic radial tire of Example 1, the index representing the width of the tire's contact patch was 101, and the index representing the area of the tire's contact patch was 103. Accordingly, both the width of the tire's contact patch and the area of the tire's contact patch were improved in Example 1. As a consequence, the pneumatic radial tire of Example 1 showed better handling stability at the time when the vehicle turned, so that the index representing the average running speed was 101, and an improvement in the average running speed was observed.

Next, various measurement results for a pneumatic radial tire of Example 2 will be described. The width of and the area of the contact patch were measured using the pneumatic radial tire of Example 2. In addition, the average running speed was measured using a set of the pneumatic radial tires of Example 2 and the same test vehicle on a circuit-running test course. FIG. 5 shows various data on Example 2 at the testing.

The pneumatic radial tire of Example 2 had a similar tread pattern to that of Example 1, and various dimensions set for the pneumatic radial tire of Example 2 were shown in FIG. 5. In short, the length, measured in the tire-radial direction, of one of the bead fillers was the only difference between the pneumatic radial tire of Example 2 and the pneumatic radial tire of Example 1 shown in FIG. 4. All the other dimensions of the pneumatic radial tire of Example 2 were the same as their respective counterparts of Example 1.

In the pneumatic radial tire of Example 2, the length, measured in the tire-radial direction, of the bead filler on the vehicle-fitted outer side was 40, which was equal to the corresponding length of the pneumatic radial tire of Conventional Example. In the pneumatic radial tire of Example 2, the length, measured in the tire-radial direction, of the bead filler on the vehicle-fitted inner side was 35.

Accordingly, in the pneumatic radial tire of Example 2, the length, measured in the tire-radial direction, of the bead filler on the vehicle-fitted inner side was set shorter than the corresponding length on the vehicle-fitted outer side.

Accordingly, in the pneumatic radial tire of Example 2, the cross-sectional area of the bead filler on the vehicle-fitted inner side was set smaller than the cross-sectional area of the bead filler on the vehicle-fitted outer side. Hence, the stiffness of the sidewall portion on the vehicle-fitted inner side was lower than the stiffness of the sidewall portion on the vehicle-fitted outer side.

As a consequence, the pneumatic radial tire of Example 2 improved the acceleration/deceleration performance and achieved a higher average running speed. Note that the indices representing the width of and the area of the tire's contact patch of the pneumatic radial tire of Example 2 were equal to their respective indices of the pneumatic radial tire of Example 1.

[Other Embodiments]

Although the invention has been described on the basis of the above-described embodiment, the description and the drawings that form part of the disclosure should not be understood as limitations to the invention. On the basis of the disclosure, those skilled in the art may conceive of various alternative embodiments, examples, and techniques to carry out the invention.

For example, in the above-described embodiment, the maximum thickness of the bead filler 6A on the vehicle-fitted outer side is set larger than the maximum thickness of the bead filler 6B on the vehicle-fitted inner side. Alternatively, the length, measured in the tire-radial direction, of the bead filler 6A on the vehicle-fitted outer side may be set longer than the length, measured in the tire-radial direction, of the bead filler 6B on the vehicle-fitted inner side. In this way, the cross-sectional area of the bead filler 6A on the vehicle-fitted outer side becomes larger than the cross-sectional area of the bead filler 6B on the vehicle-fitted inner side. Thereby, the stiffness of the sidewall portion 4A on the vehicle-fitted outer side can be made higher while the stiffness of the sidewall portion 4B on the vehicle-fitted inner side can be kept lower.

In addition, the hardness of the bead filler 6A on the vehicle-fitted outer side may be set higher than the hardness of the bead filler 6B on the vehicle-fitted inner side. In this way, the stiffness of the sidewall portion 4A on the vehicle-fitted outer side can be made higher while the stiffness of the sidewall portion 4B on the vehicle-fitted inner side can be kept lower.

In addition, if a sheet-like bead-filler sheet extending from the internal side to the external side in the tire-radial direction is provided along the bead filler 6A on the vehicle-fitted outer side, the stiffness of the sidewall portion 4A on the vehicle-fitted outer side can be made higher. On the other hand, no such bead-filler sheet is provided on the vehicle-fitted inner side, so that the stiffness of the sidewall portion 4B on the vehicle-fitted inner side can be kept lower.

In the foregoing description, the content of the invention has been disclosed on the basis of an embodiment of the invention, but the description and the drawings that form part of the disclosure should not be understood as limitations to the invention. On the basis of the disclosure, those skilled in the art may conceive of various alternative embodiments.

Needless to say, the invention includes various other embodiments that are not described in this disclosure. Accordingly, the technical scope of the invention is determined solely by the features to specify the invention described in the claims that are reasonable in view of the description given above.

The entire content of Japanese Patent Application No. 2007-286341 (filed on Nov. 2, 2007) is incorporated into the description of the present application by reference.

Industrial Applicability

As has been described above, the pneumatic radial tire according to the invention is useful because the pneumatic radial tire helps the vehicle to secure certain straight-running stability and to improve the handling stability at the time when the vehicle turns.

The invention claimed is:

1. A pneumatic radial tire comprising:
a pair of annular bead portions;
a tread portion located at an external side, in a tire-radial direction, of the pair of bead portions, and including a tread surface portion including a tire equator line that is a center line in tire-width directions;
a pair of sidewall portions each connecting one of both end portions in the tire-width directions of the tread portion and an outward end in the tire-radial direction of the corresponding one of the bead portions; and
a carcass layer extending continuously across and through the bead portions, the sidewall portions, and the tread portion, the carcass layer being configured to form a framework of the tire, wherein, in a section taken in the tire-width directions, a first rubber gauge on a vehicle-fitted outer side is thicker than a first rubber gauge on a vehicle-fitted inner side, the first rubber gauge being defined as a thickness measured from a tire's external surface to the carcass layer and measured at each of the both tire-width-direction end portions of the tread portion, and a second rubber gauge on the vehicle-fitted outer side has a smaller thickness than a second rubber gauge on the vehicle-fitted inner side does, the second rubber gauge being defined as a thickness measured from the tire's external surface to the carcass layer in the tire-width direction and measured at each of both widest portions of the sidewall portion, the widest portions being the portions protruding most externally in the tire-width directions.

2. The pneumatic radial tire according to claim 1,
wherein the carcass layer forms a case line that is a line passing through a center of the carcass layer when viewed in the section of the tire taken in the tire-width directions, and
a surface curvature radius of a portion of the case line on the vehicle-fitted outer side is larger than a surface curvature radius of a portion of the case line on the vehicle-fitted inner side, each of the portions of the case line being a portion corresponding to a portion extending from one of the tire-width-direction end portions of the tread portion to the widest portion of the corresponding one of the sidewall portions.

3. The pneumatic radial tire according to claim 1, wherein a length, measured in the tire-radial direction, from the widest portion to the bead portion on the vehicle-fitted outer side is shorter than a corresponding length on the vehicle-fitted inner side.

4. The pneumatic radial tire according to claim 1, further comprising bead fillers respectively provided at the external side, in the tire-radial direction, of the bead portions,
wherein, in the section of the tire taken in the tire-width directions, a cross-sectional area of the bead filler provided on the vehicle-fitted outer side is larger than a cross-sectional area of the bead filler provided on the vehicle-fitted inner side.

5. The pneumatic radial tire according to claim 1, further comprising bead fillers respectively provided at the external side, in the tire-radial direction, of the bead portions,
wherein a hardness of the bead filler provided on the vehicle-fitted outer side is higher than a hardness of the bead filler provided on the vehicle-fitted inner side.

6. The pneumatic radial tire according to claim 1, further comprising:
bead fillers respectively provided at the external side, in the tire-radial direction, of the bead portions; and
a sheet-like bead filler sheet provided on the bead filler on the vehicle-fitted outer side in such a manner as to extend from an internal side to the external side in the tire-radial direction.

7. The pneumatic radial tire according to claim 4, wherein a length, measured in the tire-radial direction, of the bead filler provided on the vehicle-fitted outer side is longer than a length, measured in the tire-radial direction, of the bead filler provided on the vehicle-fitted inner side.

8. The pneumatic radial tire according to claim 4, wherein a maximum thickness, measured in the tire-width directions, of the bead filler provided on the vehicle-fitted outer side is larger than a maximum thickness, measured in the tire-width directions, of the bead filler provided on the vehicle-fitted inner side.

9. The pneumatic radial tire according to claim 1, further comprising:
    main grooves formed respectively in a tire's equatorial portion including the tire equator line and in a portion located closer to the vehicle-fitted inner side than the tire's equatorial portion is, each main groove extending in a tire-circumferential direction.

* * * * *